Patented June 3, 1930

1,761,515

UNITED STATES PATENT OFFICE

ARNOLD K. BALLS, OF PHILADELPHIA, PENNSYLVANIA, ASSIGNOR OF ONE-THIRD TO MARTIN NILSSON, OF PEEKSKILL, NEW YORK, AND ONE-THIRD TO ARTHUR W. HIXSON, OF LEONIA, NEW JERSEY; THE NATIONAL CITY BANK OF NEW YORK EXECUTOR OF SAID MARTIN NILSSON, DECEASED

METHOD OF GROWING YEAST

No Drawing.   Application filed January 24, 1924. Serial No. 688,307.

This invention relates to yeast and methods of growing the same, and consists in the use of a novel raw material for the manufacture of yeast, namely the freshly pressed juice or sap of the sugar cane.

By yeast, I do not wish to be restricted to yeast used in baking, but to include also yeast used for food or food product, for extracts and for the production of alcohol and glycerin. I wish also to include the yeast used as animal food and as fertilizer.

By pressed juice, I mean the juice extracted particularly in crushing and rolling mills from any commercially used variety of the plant commonly known as sugar cane, but I do not wish to exclude the juice obtained from these plants by cutting, slicing, maceration or washing with water, or any of the known diffusion processes in which it may be obtained in a more or less diluted state.

In the known art, yeast is grown frequently upon the molasses derived from sugar cane juice, which is a by-product of the sugar industry, and will keep for indefinite periods of time. The juice of sugar cane itself is only available during the cane grinding season, which varies in different localities from a few weeks to several months a year, and which is nowhere continuous throughout the year. This juice cannot be preserved without great expense or else injury to its properties as a yeast food by the addition of antiseptics. An important commercial feature of the present invention is its use in conjunction with one of the recently discovered processes of preserving yeast, such as the process disclosed in my copending application filed December 13, 1923, Serial No. 680,528 now Patent No. 1,643,047, September 20, 1927. Owing to the now disclosed methods of maintaining the original baking strength and food properties of yeast, it is possible by means of this invention to grow the yeast profitably on the site of the sugar mill during the grinding season, and thereupon preserving the yeast, to distribute it during the remainder of the year in a still viable form.

One advantage of such a process over the methods now used, is that the sugar mill can distribute the quantity of juice obtained, which depends on the size of the crop, in two directions, making sugar and also making yeast, the relative amounts of juice used for each purpose being altered to suit the market conditions for the two or more products, instead of being dependent upon the market for one product only.

In the manufacture of yeast, there is an advantage in using the fresh juice of the cane, instead of the molasses, in that there is removed in the processes of sugar making a considerable quantity of nitrogen which becomes available for use as yeast food if the juice is used directly. Further, the loss in the quantity of cane sugar obtained from the mill, is more than made up by the increased amounts of yeast obtained from this sugar, the cost of making the yeast from the fresh juice being considerably less than that of making sugar from the same. The presence of considerable quantities of non-sugars of biological origin such as nitrogen containing substances and vitamines is an advantage, for while it appears that yeast can theoretically be grown without these substances, it is also demonstrated that large yields cannot be obtained in their absence. The extent of the vitamine content in raw juice is also greater than in any of the products derived from it, suitable for the purpose.

The method as stated above, is capable of important economic modifications within the scope of this invention. Such a modification would result in the use of cane juice from the first roller for making cane sugar, as this juice is purer and cheaper to handle in the sugar factory, and gives a larger yield of sugar than the juice from the other rollers. The juice from the third roller, for instance, being poorer in sugar, more difficult to work up, and richer in nitrogen and inorganic plant constituents, is less valuable for making sugar but more suitable for making yeast.

Another modification consists in the use of the sugar cane juice from the second or third rollers, for example, in combination with the molasses produced in the manufacture of crystallized sugar from the first portion of the juice.

In the production of maximum quantities of yeast from this material, it will be found necessary to add additional nitrogen and phosphate, in any form, organic or inorganic, which is known to be assimilable by yeast. Since the quantities of these materials present in cane sugar vary widely, and vary not only with the conditions in the grinding mill, but also with the type of soil, variety of cane, and extent and kind of fertilizing done on the land, it is impossible to state exactly how much of each of these substances should be added to produce the maximum yield of yeast. After appropriate analysis of the material, any one skilled in the art can determine the extent to which these additions are necessary.

In order to increase the amount of available nitrogen in the cane juice itself, recourse may be had to souring, wherein the sugary solution containing unavailable nitrogenous bodies is inoculated with one of the species of lactic acid producing bacilli, and incubated for one or more days at a temperature of about 55° C. This is of added importance if it becomes necessary to keep the juice in storage before using, since the souring process prevents the growth of other organisms.

If it is desired to keep the juice in storage for some days, or even several weeks, the souring is continued until 100 cc. of the juice contains the titratable equivalent of between 5 and 10 cc. of normal alkali. When concentrations of acid as high as this are reached, the formation of new acid by the lactic bacteria is very slow and finally ceases altogether, unless some neutralizing substance is added to the souring mash which can be done here but only if the preparation of lactic acid per se is desired, in which case chalk, or similar material is used. For purposes of preserving the juice, it is only necessary to allow the acid formation to proceed until it stops automatically and still maintain the temperature at 55 to 60° C. This combination of high acid concentration and high temperature is an efficient method of preventing infection and spoilage of the product. However, on dilution of this soured material with water, nothing detrimental to yeast growth is found in it. The formation of a small amount of flocculent deposit occurs on heating the fresh juice which makes any addition of solid matter as a resting place for the lactic acid bacterial unnecessary.

In one form of my process, the juice running from the sugar mill is mixed with molasses, if this modification is desired, inoculated with cultures of *Bacillus delbrücki* in the known way, and incubated at 55° for one to three days or longer until the souring shall be deemed sufficient as determined by the usual acidimetric procedures. The material is then heated to 70° C. for approximately two hours, and strained through a sieve to remove solid particles of cane fibre and the like. It is then diluted and run into a fermenter containing the stock yeast into which is also added the necessary amounts of ammonium sulphate, superphosphate, or other suitable sources of phosphorous and nitrogen. The initial specific gravity may be from 1 to 8° Brix, usually about 4°. The mash had best be kept at a temperature of about 28°, and at a pH near but not exceeding 6, by the addition of suitable quantities of lime, soda, or other alkali, or of sulphuric, phosphoric, or other non-poisonous acid. The mash is furthermore aerated at the rate proper for the particular species of yeast being grown. At the conclusion of the period of growth and enlargement of the cells, the mash is separated. If the yeast is to be made into extract, it is re-separated once or twice with water which may be slightly acidulated, and then extracted at once without pressing. If the yeast is to be dried, it is pressed after the first separation, and the drying immediately commenced.

In the above outlined process, the souring may be omitted and the still concentrated juice run continuously from the mill into the fermenter containing the growing yeast, at a rate just slightly faster than the food constituents are removed from the mash by the organisms. The additions of nitrogen and phosphorous compounds are made if and when necessary during the process; the density of the solution being maintained at about 4 or 5° Brix throughout.

The additional yeast assimilable nitrogen and phosphate required, as also the alkali, can be derived from the coagulum produced in the cane juice during clarification in the manufacture of sugar, and from the ash of the begasse, or cane fiber, which is used as fuel. The coagulum is made by heating the juices with lime, and is ordinarily skimmed off and thrown away.

While I have described in detail the preferred practice of my process, it is to be understood that the details of procedure may be widely varied without departing from the spirit of the invention or the scope of the subjoined claims.

Having thus described my invention, I claim:

1. The process of growing yeast comprising pressing sugar cane a plurality of times to express sugar cane juice therefrom, mixing the juice of the sugar cane obtained from a latter of a series of pressings of the cane fiber with molasses derived from the juice of a former pressing of similar fiber, and propagating the yeast by fermentation in said mixture.

2. The process of growing yeast comprising pressing sugar cane a plurality of times to express sugar cane juice therefrom, mixing the juice of the sugar cane obtained from the final pressing of the cane fiber with molasses derived from the juice of the first pressing of similar fiber, and propagating the yeast by fermentation in the mixture of sugar cane juice and molasses.

3. The process of growing yeast comprising pressing sugar cane a plurality of times to express sugar cane juice therefrom, inoculating with yeast a mixture of molasses and juice obtained from any pressing of the sugar cane other than the first pressing and propagating the yeast by fermentation in said mixture of molasses and sugar cane juice.

In testimony whereof, I affix my signature.

ARNOLD K. BALLS.